United States Patent [19]

Krakovsky

[11] 4,449,547
[45] * May 22, 1984

[54] LONG LIFE GATE VALVE

[76] Inventor: Rafael Krakovsky, 19581 Transhire Rd., Gaithersburg, Md. 20879

[*] Notice: The portion of the term of this patent subsequent to Feb. 15, 2000 has been disclaimed.

[21] Appl. No.: 462,988

[22] Filed: Feb. 1, 1983

Related U.S. Application Data

[63] Continuation-in-part of Ser. No. 210,786, Nov. 26, 1980, Pat. No. 4,373,546.

[51] Int. Cl.³ .................................................. F16K 29/00
[52] U.S. Cl. .................................... 137/330; 251/210; 251/327; 251/328
[58] Field of Search ...................... 137/330, 331, 625.3, 137/625.31, 628; 251/176, 193, 195, 205, 210, 267, 270, 298, 299, 300, 301, 326, 327, 328; 138/45, 46

[56] References Cited

U.S. PATENT DOCUMENTS

| | | | |
|---|---|---|---|
| 587,439 | 8/1897 | Jenkins | 251/328 |
| 786,043 | 3/1905 | Luckett | 137/331 |
| 1,004,845 | 10/1911 | Böhme | 251/210 |
| 1,324,351 | 12/1919 | Haynes | 251/195 |
| 1,586,345 | 5/1926 | Wilson | 251/267 |
| 3,542,338 | 11/1970 | Scaramucci | 251/328 |
| 4,367,766 | 1/1983 | Uomala | 137/330 |
| 4,373,546 | 2/1983 | Krakovsky | 137/330 |

FOREIGN PATENT DOCUMENTS 884307 12/1961 United Kingdom ............... 251/176

*Primary Examiner*—George L. Walton
*Attorney, Agent, or Firm*—Laurence R. Brown

[57] ABSTRACT

A gate valve presents on a flat valve seat surface defining a fluid flow path the mating flat surface of a freely rotatable circular disc carried at its center along a longitudinally moving straight line axis. The valve seat defines a fluid flow aperture asymmetrically disposed to the disc center movement line to thereby create a turning moment from pressure and flow of fluid through the valve seat. This serves without ratching mechanisms to rotate the disc periphery randomly thereby presenting different disc edge portions in a wear position from the fluid flow. Accordingly, wear is evenly distributed about the peripheral edge to significantly increase life and reduce sealing problems from chemical or sediment materials coming between the disc and valve seat surfaces. By mounting the disc and valve seat surfaces at an acute angle to the axis of movement, the disc is freely rotatable and subject to the turning moment up until the time they are frictionally wedged together in a sealed valve closure position.

3 Claims, 3 Drawing Figures

LONG LIFE GATE VALVE

This is a continuation-in-part of the co-pending application Ser. No. 210,786 filed Nov. 26, 1980 now U.S. Pat. No. 4,373,546 dated Feb. 15, 1983.

TECHNICAL FIELD

This invention relates to valve methods and apparatus and more particularly it relates to prolonging life of gate valves having rotating aperture closure discs.

BACKGROUND ART

Gate valves having discs moved into position to close apertures have long been known. Thus, U.S. Pat. No. 786,043—Gustavus T. Luckett—Mar. 28, 1905, shows a typical gate valve in which two substantially flat back to back discs are arranged to be seated and unseated by means of a suitably actuated stem.

Another version of these valves, also known as a "loose-seat gate valve" is shown in U.S. Pat. No. 1,586,345—Wylie G. Wilson—May 25, 1926, where the two discs are pressed apart by a spring to establish and maintain a seal between the sealing element of the valve and its seat. Provision for convenient and expeditious repair is its objective.

Conventional valves of this type are subject to wear by the fluid flow through the valve resulting in a weardown of the edges of the control disc. This not only changes valve closure characteristics in the flow path, but also prevents the operation of the shear cleaning action of the disc in passing across the aperture facing, even to the extent of letting particles ride between the disc and seat. Thus, the life of these valves is materially shortened.

Thus, it is an objective of this invention to improve the long life characteristics of such gate valves and to correct the wear deficiencies of the prior art.

It is noted that the above cited U.S. Pat. No. 786,043 attempted to solve the problem of wear on the edges of the control disc by provision of a series of lugs on the discs which engaged with rigid studs on the side of the valve chamber, thus creating a ratcheting effect, thereby causing the valve discs to be revolved, always in the same direction, by means of the opening and closing of the valve.

This structure, however, has various shortcomings. Thus, for example, the discs must be turned by closure force from the stem as they are being seated in a position where they are being wedged tightly against the seats. This wears and tends to cause leakage through the packing ring, which of itself reduces the valve life.

It is a further objective of this invention to simplify the construction of this type of valve, and improve upon the solution to the wear problem.

BRIEF DISCLOSURE OF THE INVENTION

In order to improve valve performance and life, a circular valve disc of greater surface area than the aperture to be closed is mounted for free rotation in a random amount during the closure by means of the flow and pressure of water through the valve. The disc and aperture are relatively moved in a mode which causes random rotational positioning of the disc in the valve closing and opening actions thereby to distribute wear on the edge of the disc caused from fluid flow about the disc periphery. The valve flow aperture to be closed by the disc may be asymmetrical in shape and in any event is asymmetrically disposed about the movement path of the center of the rotary disc into mating position to thereby generate a turning moment on the rotary disc by flow and pressure of fluid through the closure position, to present a random peripheral segment of the disc to the fluid flow thereby distributing wear about the entire disc periphery.

Other features, advantages and objectives of the invention are found throughout the following drawing, description and claims.

DETAILED DESCRIPTION OF PREFERRED EMBODIMENTS

Figure 1:
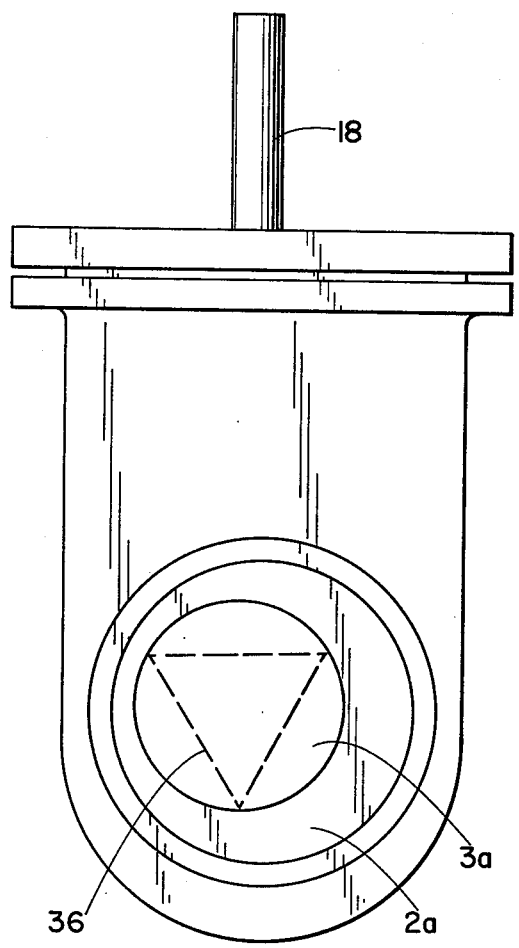
FIG. 1 is an end view of the slow-close gate valve embodiment of the invention looking into the flow path.
Figure 2:
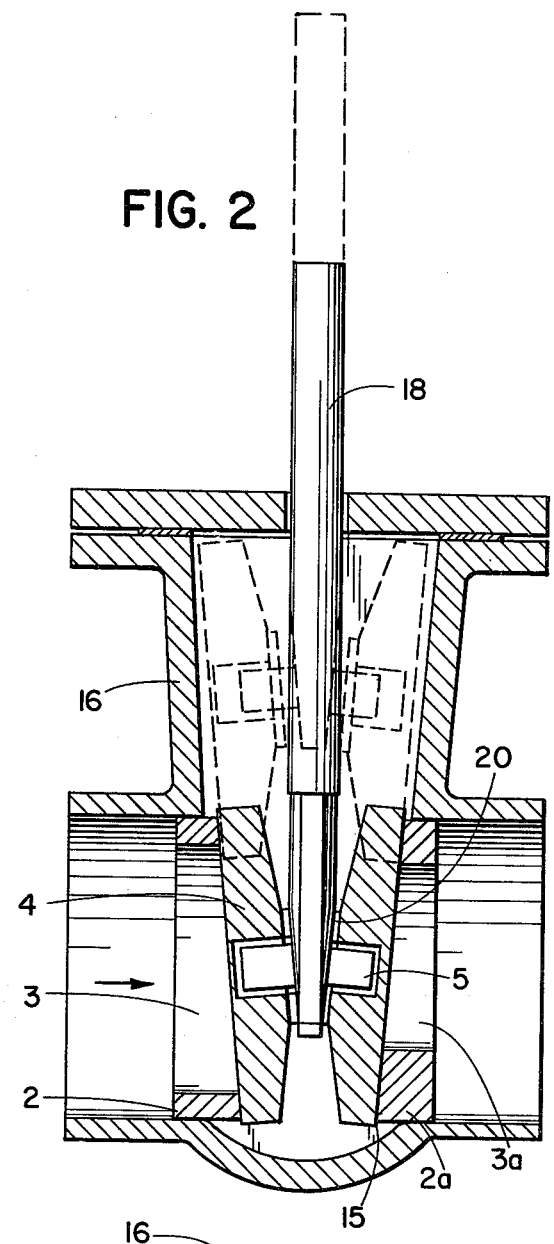
FIG. 2 is a center-line section side view sketch of the significant portions of the improved valve of FIG. 1 afforded by this invention.
Figure 3:
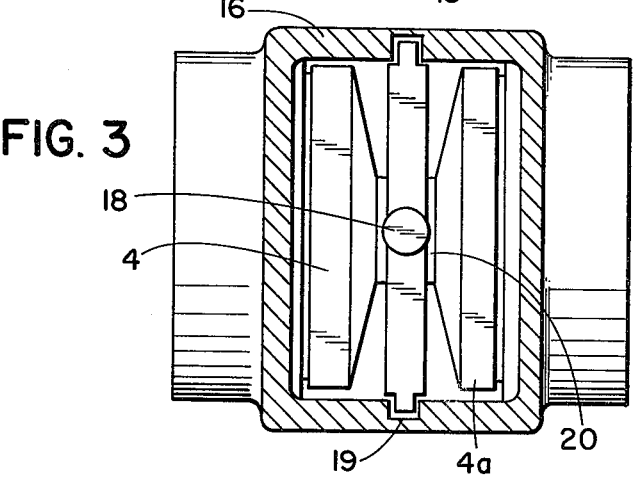
FIG. 3 is a top section view of the valve as seen in FIG. 2.

AS may be visualized from the views of FIGS. 1 through 3, a slow close gate valve arrangement operable by a shaft 18 rotatable in a screw thread mechanism (not shown) embodies the invention.

In this valve, two discs 4, 4a control the fluid flow in the direction defined by the arrows. The two circular discs are held back to back by an assembly on the lower end of the shaft 18 by confinement as loosely mounted for free rotation on shaft 5. This mount permits low friction rotation of the discs during the closure period before the discs are wedged into tight closure position because of the slant of the discs and seats from the vertical axis. It is this freedom of rotation of the disc which is critical to the performance and the life of the valve in accordance with this invention. The two discs set at an angle relative to shaft 18 are moved into registration concurrently across the likewise slanted innermost faces of the two valve seats 2, 2a. The two discs are moved by means of the linear movement of the shaft 18 towards the apex of the angle defined by the inner surfaces of the valve seats, thereby to firmly wedge the discs and valve seats into closure position.

It is noted that aperture 3 is larger than aperture 3a. Thus, variable flow control through the valve is affected primarily by the position of disc 4a relative to aperture 3a. As described in my aforementiond patent the aperture may be asymmetrical in shape or otherwise asymmetrically located relative to the closure path of the center of disc 4a, to thereby generate a turning movement on the rotary disc by flow of fluid through the closure aperture as it is relatively moved in or out of closure position. This presents a random peripheral segment of the disc to the fluid flow at substantially an infinite number of stop positions thereby evenly distributing wear about the entire disc periphery. Otherwise, a significant wear would occur at the valve disc 4a lowermost portion of the corner edge 15, over which the water flows to pass through aperture 3a. This wear effect is most prominent when the valve is partly closed as a control valve since flow aperture 3 is larger than aperture 3a and remains open until after the aperture 3a is closed by disc 4a. This provides water pressure inside housing 16 against the disc 4a in the closure direction to aid in seating the disc surface firmly against the seat 2a in the control area until the wedge action seals the valve discs into closure position.

As seen from the asymmetrically located aperture 3a in FIG. 1 or the alternatively phantom, triangular asymmetrical opening 3b, the water flow path produces a rotational torque on disc 4a about center post 5 to rotate it whenever the friction between the disc 4a and seat 2a is not high from the wedging action. Thus, the greatest amount of rotation is encountered before the valve is near closure position. The asymmetry and flow control may be modified by an aperture shape such as triangular 3b, if desired. This triangular aperture further in the control valve function limits the flow wear on disc 4a edge 15 to a smaller peripheral arc area.

Note that the wear at edges 15 of disc 4a is a serious problem because the resulting rounded corners permit the tilting of disc 4a away from seating position because of sediment such as sand entering between the disc 4a and seat 2a. A sharp clean edge will brush or scrape away film, chemical deposits and foreign objects. Thus, the valve deteriorates rapidly after wear occurs at this critical position.

It is by this invention therefore unobvious and unexpected that the ratcheting mechanisms for turning the disc can be eliminated and even better performance occurs. Thus, if nine ratchet positions are provided, it may be assumed thereby that the life is extended ninefold by the prior Luckett device which distributes edge wear to nine positions. With applicant's device no ratchet mechanism is necessary which can wear or jam and which requires complex and expensive construction. Furthermore, applicant's device in essence provides an infinite number of edge wear positions, thereby assuring much longer wear with much simpler construction. Note that indentations of wear about the periphery at the nine ratchet positions more or less resulting in pronounced pockets or scalloped indentations does not overcome the aforesaid problems of disc wear that prevent scraping of the seat clean of sediment by the disc and that permit the entry of sand or other sediment between the disc and seat.

In FIG. 3 is shown the guide channel and tongue mechanism 19 that prevents rotation of the discs 4, 4a about shaft 18.

Accordingly, it is seen that this invention improves the prior art by distributing wear from fluid flow evenly about the entire periphery of a freely rotatable disc while eliminating ratcheting mechanisms. This is achieved by mating a valve seat with a flat surface disposed in a fluid flow path with the flat surface of a freely-rotatable circular closure disc longitudinally movable along its center over a straight line axis into and out of registration to restrict and close the fluid flow path, and disposing the fluid flow path through the valve seat asymmetrically about the path of the disc center. Thus, the fluid flow and pressure through the valve seat imparts a turning moment to the freely rotatable disc and randomly presents different portions of the disc edge to the fluid flow path through the fluid flow path through the valve seat in response to the turning moment. This evenly distributes wear about the entire disc periphery and thus significantly extends valve life and reduces sealing problems caused by the tendency of the disc and seat to be separated by chemical or residue accumulations, sand, etc. By mounting the disc and seat at an acute angle to the movement axis, the disc is freely rotatable over the movement path up until the disc is wedged frictionally in place on the valve seat to seal the flow path.

It is evident therefore that the present invention has improved the state of the art by making valves of the slow-close gate type more reliable over longer periods of use. Therefore, those features of novelty believed descriptive of the spirit and nature of this invention are defined with particularity in the following claims.

I claim:

1. In a long life gate valve having a pair of rotatable closure discs mounted for longitudinally positioning into partial or full registration with mating valve seats to control fluid flow, the improvement for extending valve life by distributing wear about the periphery of the disc resulting from fluid flow thereacross substantially about the entire disc periphery for even wear thereabout, comprising in combination, means presenting two spaced valve seats with flat surfaces surrounding flow apertures of different size that define a fluid flow path through the valve from a larger upstream aperture to a smaller downstream aperture, a mating circular closure disc having a flat surface for mating with each said valve seat surface in a registration position for fully closing said fluid flow path, movement means for longitudinally moving the center of both circular disc surfaces in unison along a straight line axis into and out of seated registration on said seat surfaces to restrict and close the fluid flow path, means for holding at least the downstream closure disc in a freely rotatable mode about its center as it is moved along said axis into and out of seated registration so that it is rotatable by fluid flow in unseated transit positions, and aperture structure defined by said valve seats to present a fluid flow path asymmetrically disposed about the rotatable downstream disc whereby the fluid flow and pressure through the aperture structure and fluid flow path imparts a turning moment to the freely rotatable disc thereby to randomly present different portions of the disc edge to the fluid flow path through the valve seat in response to said turning moment when the discs are longitudinally moved in and out of registration 2. The improved combination defined in claim 1 further wherein said pair of discs are carried by said movement means with their flat surfaces disposed at an acute angle, and the mating valve seat surfaces for both discs are disposed to receive the discs in wedged position therebetween to close the flow path through the valve seats.

3. The valve defined in claim 1 further comprising a downstream aperture shape that limits the flow wear on the edge of the downstream mating disc to a confined peripheral arc area.

* * * * *